United States Patent [19]
Nugent

[11] Patent Number: 5,594,866
[45] Date of Patent: Jan. 14, 1997

[54] MESSAGE ROUTING IN A MULTI-PROCESSOR COMPUTER SYSTEM WITH ALTERNATE EDGE STROBE REGENERATION

[75] Inventor: Steven F. Nugent, Portland, Oreg.

[73] Assignee: Intel Corporation, Santa Clara, Calif.

[21] Appl. No.: 618,037

[22] Filed: Mar. 18, 1996

Related U.S. Application Data

[63] Continuation of Ser. No. 127,081, Sep. 23, 1993, abandoned, which is a continuation of Ser. No. 597,073, Oct. 15, 1990, abandoned, which is a continuation-in-part of Ser. No. 298,551, Jan. 18, 1989, abandoned.

[51] Int. Cl.⁶ ............................................. G06F 13/00
[52] U.S. Cl. ...................... 395/200.13; 395/200.15; 395/200.19; 375/211; 375/214
[58] Field of Search ................................ 375/211, 214; 395/200, 580, 200.13, 200.18, 200.19; 327/165; 370/60, 211, 214

[56] References Cited

U.S. PATENT DOCUMENTS

| | | | |
|---|---|---|---|
| 3,639,694 | 2/1972 | Deutsch et al. | 364/200 |
| 3,680,056 | 7/1972 | Kropfl | 364/200 |
| 4,168,531 | 9/1979 | Eichelberger et al. | 364/900 |
| 4,225,921 | 9/1980 | Hartley et al. | 364/200 |
| 4,417,213 | 11/1983 | Ito | 307/269 |
| 4,438,520 | 3/1984 | Saltzer | 375/4 |
| 4,547,850 | 10/1985 | Genma | 364/200 |
| 4,571,675 | 2/1986 | Stambaugh et al. | 364/200 |
| 4,598,360 | 7/1986 | Loskorn | 364/200 |
| 4,633,464 | 12/1986 | Anderson | 370/111 |
| 4,670,871 | 6/1987 | Vaidya | 370/60 |
| 4,691,294 | 9/1987 | Humpleman | 398/200 |
| 4,694,291 | 9/1987 | Denhez et al. | 340/825.2 |
| 4,739,476 | 4/1988 | Fiduccia | 364/200 |
| 4,766,534 | 8/1988 | DeBenedictis | 364/200 |
| 4,773,067 | 9/1988 | Duxbury | 370/94 |
| 4,780,889 | 10/1988 | Ley et al. | 375/106 |
| 4,783,791 | 11/1988 | Yoshino | 375/3 |
| 4,814,980 | 3/1989 | Peterson et al. | 364/200 |
| 4,816,989 | 3/1989 | Finn et al. | 395/200 |
| 4,851,995 | 7/1989 | Hsu et al. | 364/200 |
| 4,868,818 | 9/1989 | Madan et al. | 371/11.3 |
| 4,891,751 | 1/1990 | Call et al. | 364/200 |
| 4,897,779 | 1/1990 | Dickson et al. | 364/200 |
| 4,933,933 | 6/1990 | Dally et al. | 370/60 |
| 4,933,936 | 6/1990 | Rasmussen et al. | 370/85.9 |
| 4,942,517 | 7/1990 | Cok | 364/200 |
| 4,943,946 | 7/1990 | Brent | 365/189.12 |
| 4,984,235 | 1/1991 | Hillis et al. | 370/60 |
| 4,991,079 | 2/1991 | Dann | 364/200 |
| 5,008,882 | 4/1991 | Peterson et al. | 370/94.3 |
| 5,097,468 | 3/1992 | Earlie | 371/15.1 |
| 5,109,353 | 4/1992 | Sample et al. | 364/578 |
| 5,210,773 | 5/1993 | Schmid et al. | 375/4 |

FOREIGN PATENT DOCUMENTS

| | | |
|---|---|---|
| 0132926 | 2/1985 | European Pat. Off. . |
| 2227341 | 7/1990 | United Kingdom . |
| 8700374 | 1/1987 | WIPO . |

*Primary Examiner*—Christopher B. Shin
*Attorney, Agent, or Firm*—Blakely, Sokoloff, Taylor & Zafman

[57] ABSTRACT

A parallel processing computer system having an improved architecture for communication of information between nodes. The computer system of the present invention comprises at least three nodes; each of the three nodes for processing information. Each of the nodes comprises a routing means for routing information between nodes. The routing means allow reservation of a route through the network of nodes. Messages may then be transmitted from an origin node to a destination node over the reserved route. Use of a route reservation system reduces requirements for buffering of information at intermediate nodes on a route, improves message passing latency and increases node-to-node bandwidth. The present invention teaches communication of messages between nodes in a synchronous manner using a common strobe signal. The strobe signal is modified by regenerating alternate edges of the signal in order to eliminate pulse shrinkage of the strobe signal.

18 Claims, 14 Drawing Sheets

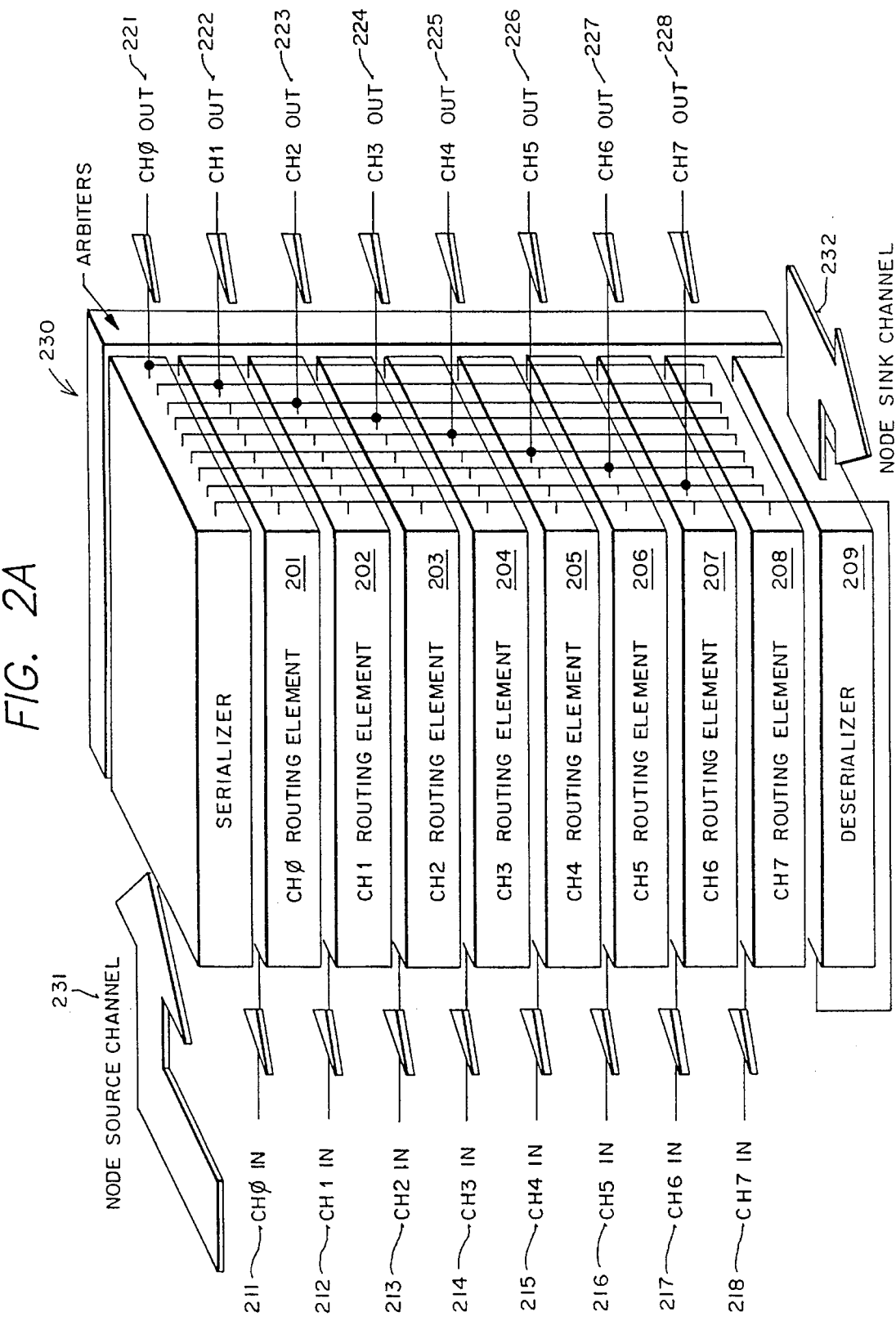

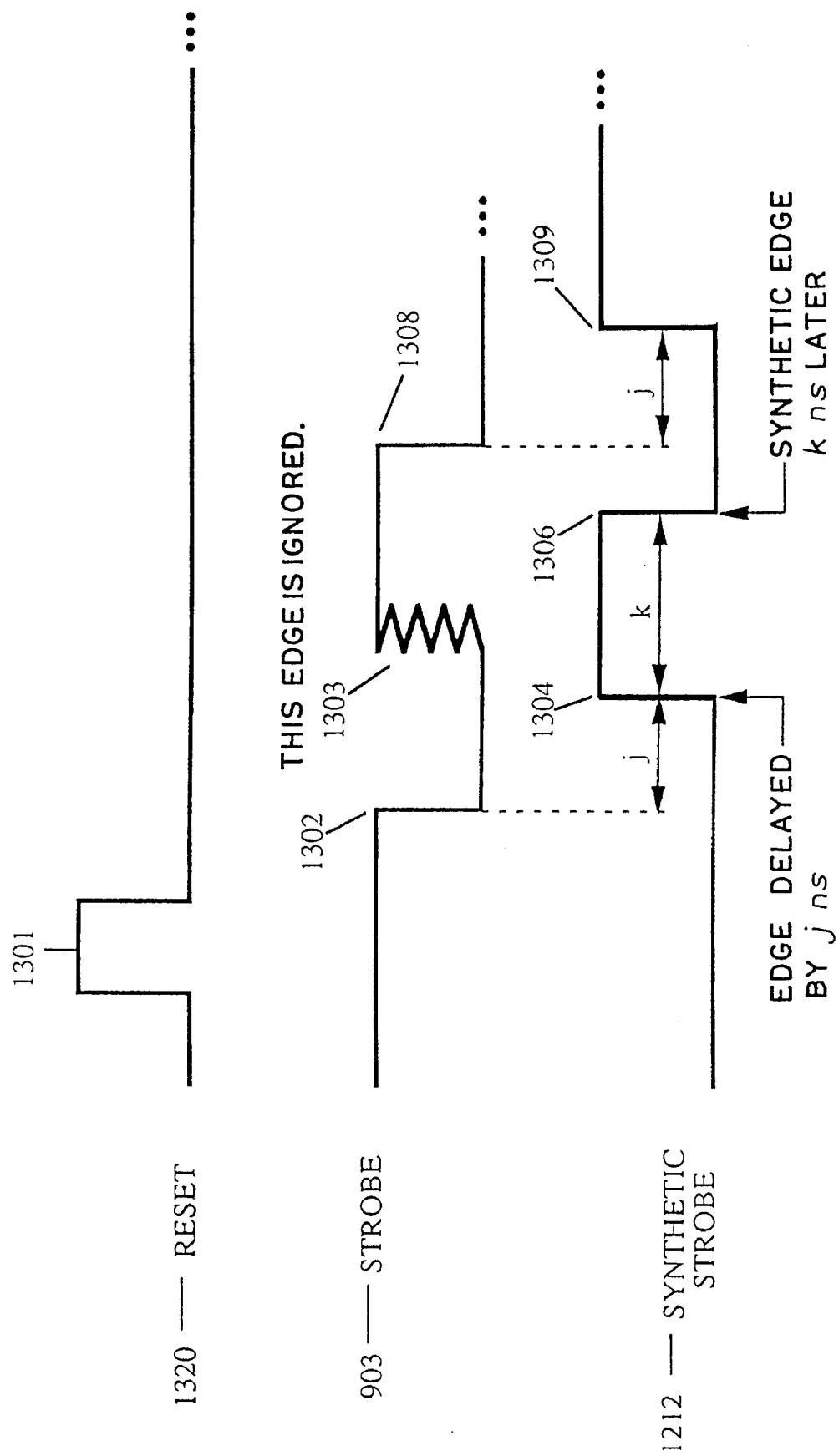

MESSAGE ROUTING IN A MULTI-PROCESSOR COMPUTER SYSTEM WITH ALTERNATE EDGE STROBE REGENERATION

BACKGROUND OF THE INVENTION

This application is a continuation of patent applicant of U.S. application Ser. No. 08/127,081, filed Sep. 23, 1993, abandoned, which is a continuation of patent applicant of U.S. application Ser. No. 07/597,073, filed Oct. 15, 1990 abandoned, which is a continuation-in-part of patent applicant of U.S. application Ser. No. 07/298,551, filed Jan. 18, 1989 abandoned.

1. Field of the Invention

The present invention relates to the field of parallel processing computer systems.

2. Prior Art

A number of parallel processing computer systems are well known in the prior art. Generally, in such systems a large number of processors are interconnected in a network. In such networks each of the processors may execute instructions in parallel. In general, such parallel processing computer systems may be divided into two categories: (1) a single instruction stream, multiple data stream system (SIMD) and (2) a multiple instruction stream, multiple data system stream (MIMD) system. In a SIMD system, each of the plurality of processors simultaneously executes the same instruction on different data. In MIMD system, each of the plurality of processors may simultaneously execute a different instruction on different data.

In either SIMD or MIMD system, some means is required to allow communication between processors in the computer system. In such systems, it is known to logically organize processors in an n-cube. A discussion of such n-cube systems may be found in Herbert Sullivan and T. R. Bashkow, A Large Scale Homogeneous, Fully Distributed Parallel Machine, *Proceedings of the 4th Annual Symposium on Computer Architecture*, pp. 105–117, 1977. Sullivan et al. discusses a number of interconnection structures, including connection of processors on a boolean n-cube. The described boolean n-cube is an interconnection of N ($N=2^n$) processors which may be thought of as being placed at the corners of an n-dimensional cube. Sullivan et al. discloses the location of a processor which may be described by designating one processor as the origin with a binary address of (0,0, . . . 0) of n bits. Other processors may then have their locations expressed as an n bit binary number in which each bit position is regarded as a coordinate along one of the n-dimensions. In such a system, when one processor is directly linked to another, their addresses will differ by just one bit. The position of this bit indicates the direction in n-space along which communication between the processors takes place. Thus, the address of one processor with respect to a neighboring processor differs by only one bit.

Sullivan et al. describes that in such a system a relative address may be computed by taking the bit-by-bit sum (modulo 2) of the addresses of two processors. This bit-by-bit summation is the equivalent of taking an exclusive OR of the two addresses. The number of non-zero bits in the resulting relative address represents the number of links which must be traversed to get from one processor to another.

U.S. Pat. No. 4,598,400 Hillis describes a similar n-cube parallel processing computer system in which an array of nodes are interconnected in a pattern of two or more dimensions and communication between the nodes is directed by addresses indicating displacement of the nodes. Hillis specifically discloses a system in which a message packet may be routed from one node to another in an n-cube network. The message packet comprises relative address information and information to be communicated between the nodes.

Many known parallel processing computer systems utilize a store-and-forward mechanism for communicating messages from one node to another. The Hillis system describes such a store-and-forward mechanism. Such store-and-forward mechanisms are more clearly described in Parviz Kermani and Leonard Kleinrock, Virtual Cut-Through: A new Computer Communication Switching Technique, *Computer Networks*, Vol. 3, 1979, pp. 267–286. Kermani et al. distinguishes store-and-forward systems from circuit switching systems. Specifically, a circuit switching system is described as a system in which a complete route for communication between two nodes is set up before communication begins. The communication route is then tied up during the entire period of communication between the two nodes. In store-and-forward (or message) switching systems, messages are routed to a destination node without establishing a route beforehand. In such systems, the route is established dynamically during communication of the message, generally based on address information in a message. Generally, messages are stored at intermediate nodes before being forwarded to a selected next node. Kermani et al. further discusses the idea of packet switching systems. A packet switching system recognizes improved utilization of resources and reduction of network delay may be realized in some network systems by dividing a message into smaller units termed packets. In such systems, each packet (instead of message) carries its own addressing information.

Kermani et al. observes that extra delay is incurred in known systems because a message (or packet) is not permitted to be transmitted from one node to the next before the message is completely received. Therefore, Kermani et al. discloses an idea termed "virtual cut-through" for establishing a communication route. The virtual cut-through system is a hybrid of circuit switching and packet switching techniques in which a message may begin transmission on an outgoing channel upon receipt of routing information in the message packet and selection of an outgoing channel. This system leads to throughput times exactly the same as in a store-and-forward system when all intermediate channels are busy. When all intermediate nodes are idle, this system leads to throughput times similar to a circuit switched system. However, the system disclosed by Kermani et al. still requires sufficient buffering to allow an entire message to be stored at each node when all channels are busy.

W. J. Dally, A VLSI Architecture for Concurrent Data Structures, Ph.D Thesis, Department of Computer Science, California Institute of Technology, Technical Report 5209, March 1986, discusses a message-passing concurrent architecture to achieve a reduced message passing latency. In Chapter 3, Dally discusses a balanced binary n-cube architecture.

In Chapter 5, Dally discusses an application for reducing message latency. In general, Dally discloses use of a wormhole routing method, rather than a store-and-forward method. A wormhole routing method is characterized by a node beginning to forward each byte of a message to the next node as the bytes of the message arrive, rather than waiting for the next arrival of the entire packet before beginning transmission to the next node. Wormhole routing thus results in message latency, which is the sum of two terms, one of which depends on the message length L and the other of which depends on the number of communication channels traversed D. Store-and-forward routing yields latency depending upon the product of L and D. (See Dally at page 153).

A further advantage of a wormhole routing method is that communications do not use up the memory bandwidth of intermediate nodes. In the Dally system, packets do not interact with the processor or memory of intermediate nodes along the route, but rather remain strictly within a routing chip network until they reach their destination.

However, the Dally discloses a self-timed system, permitting each processing node to operate at its own rate with no global synchronization. (See Dally at page 153).

Dally at pages 154–157 further discloses a message packet containing comprising relative X and Y address fields, a variable size data field comprising a plurality of non-zero data bytes and a tail byte.

It is desired to develop an improved method of communication between nodes in a parallel processing computer system.

As another objective of the present invention, it is desired to develop a parallel processing computer system having reduced message passing latency and increased node-to-node channel bandwidth.

As another object of the present invention, it is desired to develop a system which efficiently passes messages without requiring buffering for message packets at each node.

As another object of the present invention, it is desired to develop a system in which data communicated within a system is controlled by a clock communicated with the data.

An inherent limitation in a system controlled by a clock (strobe) communicated with the data is the ability to extend the system topology without bound. This limitation occurs due to the fact that the strobe signal is not regenerated as it is routed through each node of a path as is the data. Since the strobe is not regenerated, it is susceptible to a phenomenon known as pulse shrinkage.

Pulse shrinkage occurs when a signal is buffered through devices that have unequal rise and fall times. Pulse shrinkage can cause severe asymmetry in the strobe signal and ultimately can cause data errors.

Data errors can occur when data hold times are violated due to pulse shrinkage. Data hold time in the present invention is guaranteed by the frequency of the strobe clock. Lower frequencies will create more hold time. Since the data is validated on both edges of the strobe, any asymmetry in this signal will increase the effective frequency and reduce the available data hold time. As the length of the route is increased, the effects of pulse shrinkage become more pronounced and will eventually cause errors.

It is therefore another objective of the present invention to provide a system wherein pulse shrinkage of the strobe is eliminated.

SUMMARY OF THE INVENTION

A parallel processing computer system is described. The present invention comprises a computer system having a plurality of processing nodes which are interconnected in a binary n-cube. Each node comprises a processing means for processing information and a router means for routing information between nodes in the n-cube.

The router means accepts address information from the processing means and communicates the address information from node-to-node to establish a communication route for information from an origin node to a destination node. After a communication route is established, the destination node responds over the same route, in reverse order, with an acknowledgement that it is ready to accept information.

Communication of information then commences over the reserved route. At the completion of communication of information, the route is released and channels used by the route are made available for communication between other nodes.

In the present invention, each router means comprises two channels for communication of information. A first channel is utilized to transmit information from a node to an adjacent node and a second channel is utilized to receive information from adjacent nodes. The present invention allows communication of information between nodes under control of a clock "strobe" transmitted with the information. Each of the channels comprises means for communication of data information (both actual message data and status/control information) and for communication of clocking information for controlling transmission and reception of the data information.

The alternate-edge regeneration circuit described herein eliminates the pulse shrinkage hazard by regenerating every other edge of the strobe signal as it is routed through each node of the route. All odd edges of the strobe signal are unmodified by the routing hardware. They are used to validate the data received at each router and to clock the data through to the next router. The buffered odd clock edges are then transmitted to the next router. Upon reception of a message, the even edges of the strobe signal validate the data so that it can be stored in a receive register. This is the same as the odd edges. The even edges, however, are handled differently. After the data has been latched in the receiving register, it is clocked to the next register within the router using a modified or "synthetic" even clock edge rather than the received even strobe edges. The synthetic clock edge is generated by delaying the odd clock edges an amount approximately equal to half the period of the strobe signal. This positions the even edges ideally in time and compensates for any pulse shrinkage that might be present in the received strobe waveform. The strobe is in effect "regenerated" and its symmetry when transmitted from the router will be consistent from one router to the next.

BRIEF DESCRIPTION OF THE DRAWINGS

FIG. 2(a) is a block diagram illustrating a router architecture of the present invention.

FIG. 13 illustrates a timing diagram of the synthetic clock generator circuit of the present invention.

DETAILED DESCRIPTION OF THE PRESENT INVENTION

Figure 1:
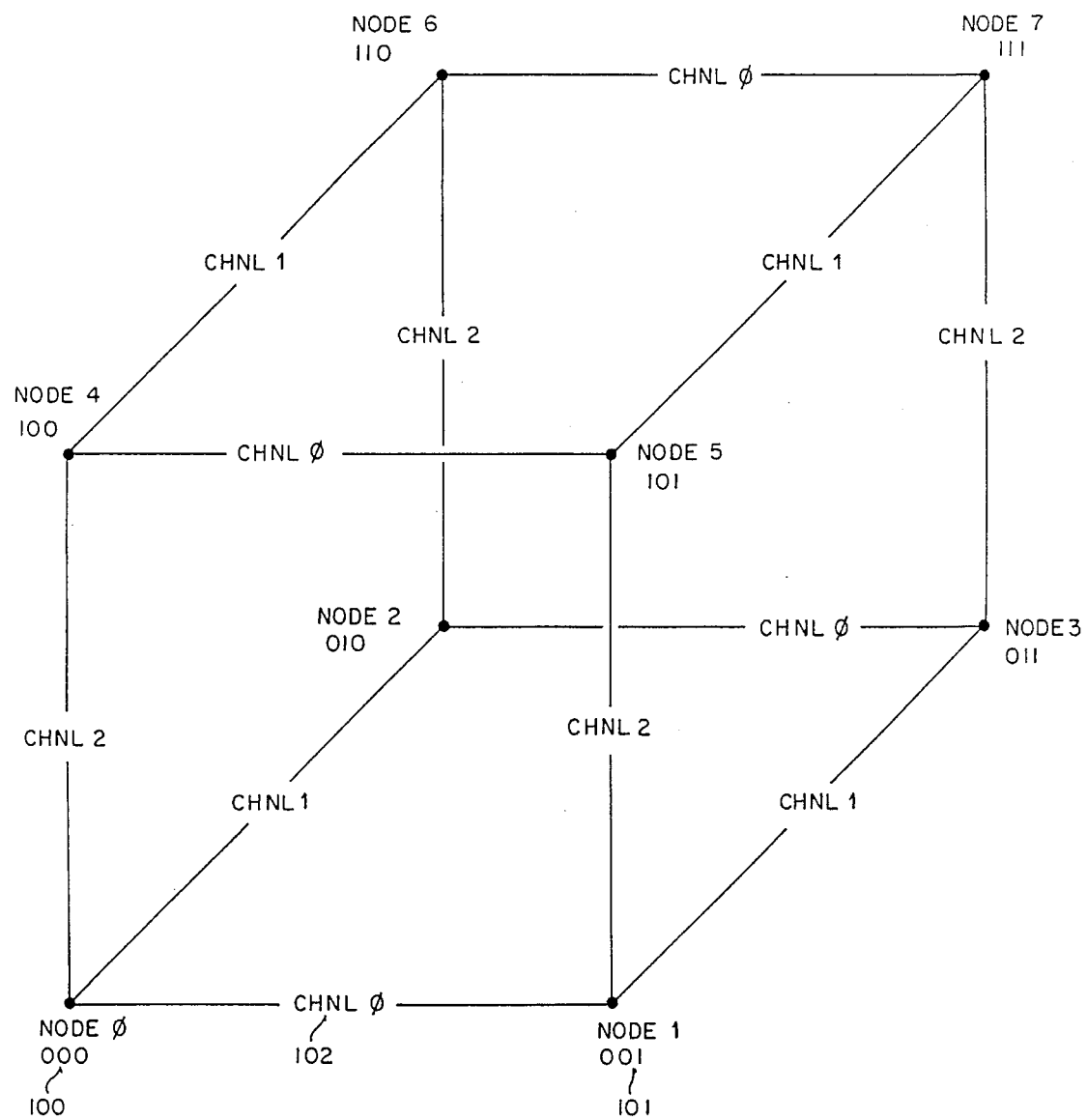
FIG. 1 is a diagram illustrating a n-cube network of processors as may be utilized by the present invention.

A parallel processing computer system is described. In the following description, numerous specific details are set forth in order to provide a thorough understanding of the present invention. It will be apparent, however, to one skilled in the art that the present invention may be practiced without these specific details. In other instances, well-known circuits, structures and techniques have not been shown in detail in order not to unnecessarily obscure the present invention.

The present invention relates to parallel processing computer systems. The preferred embodiment of the present invention is commercially available under the tradename iPSC/2™ for Intel Corporation of Santa Clara, Calif. The iPSC/2™ computer is a second generation concurrent processing computer system. The routing system of the iPSC/2™ is more fully described in Steven F. Nugent, The iPSC/2™ Direct-Connect™ Communications Technology, Intel Scientific Computers, distributed Hypercube Conference, Jan. 19–20, 1998.

OVERVIEW OF THE PRESENT INVENTION

The present invention discloses a direct connection routing mechanism which provides for improved performance over known parallel processing computer systems. The direct connection mechanism enhances performance in parallel processing computer systems by reducing message passing latency, increasing node-to-node bandwidth and allowing for simultaneous bidirectional message traffic between any two nodes.

The direct connect routing system is a hardware controlled message passing system comprising a plurality of routers, each router coupled with computation nodes, the routers for allowing passing of messages of arbitrary size between pairs of computational nodes. The routers form a circuit-switched network that dynamically creates a route from a source node to a destination node. The route remains open for the duration of the message. The route comprises a series of channels that form a unique route from the source node to the destination node. The route may pass through some number of intermediate nodes in defining the route. The route allows transmission of data and a clock controlling transmission of the data over the same route.

Channels in the preferred embodiment of the present invention are bit-serial and full duplex and provide connection from one node to its nearest neighbor nodes in n-space. In the preferred embodiment, a router supports connections for up to eight full duplex channels and may be interconnected to form networks of up to seven dimensions containing 128 nodes. It is apparent to one of ordinary skill in the art that alternative embodiments may be constructed having a greater or fewer number of dimensions and/or nodes.

Each of the eight channels is routed independently, allowing up to eight messages to be routed simultaneously. In the preferred embodiment, one channel per router is dedicated to act as an external route into the network and allows remote devices to access the full routing capabilities of the network.

The router communicates with its computational node over two unidirectional parallel buses.

Routing in the preferred embodiment is based on the n-cube routing algorithm discussed in Sullivan et al. This algorithm guarantees a deadlock free network. As will be described in more detail below, in the present invention, routes are dynamically constructed for each message prior to its transmission. A complete route is built in a step-by-step process in which route segments are arbitrated from at each router. After a route is defined, the channels which constitute the route are held for the duration of the message. Transmission of a message begins when the destination node is ready to begin accepting the message and channels are released when the end of the message passes through the routers connected by the channel.

The direct connection routing system of the present invention is a variation on wormhole routing discussed by Dally. As one inventive aspect of the present invention, the message is transmitted after the route is established, rather than establishing the route as part of the transmission of the message, as discussed by Dally. This aspect of the present invention allows the system to operate completely synchronously and reduces or eliminates the need for flow control buffering in intermediate routers.

In the present invention, a routing probe comprising relative address information is first transmitted from router to router in the network in order to establish a route between an origin node and a destination node. After the route is established, the message is communicated between the two nodes. Further, the present invention provides separate circuitry different from the computation circuitry of a node, for controlling routing. Using these aspects of the present invention, message passing latency is significantly reduced over known systems. As discussed above, such known systems largely utilize store-and-forward, packet switching networks.

Using the above described techniques, messages are routed from an origin node to a destination node encountering minimal delays in routing through intermediate nodes. Further, the routing of messages through intermediate nodes does not require interruption of processes on those nodes or flow control buffering at the intermediate nodes.

The preferred embodiment of the present invention implements routers using programmable gate arrays.

The preferred embodiment comprises a collection of single board processors or nodes interconnected with full duplexed, bit-serial channels to form a cube where each node has N nearest neighbor nodes. The system is then said to have a dimension N. The preferred embodiment comprises 128 nodes where N equals 7. Referring to FIG. 1, channel and node naming conventions used herein are illustrated. FIG. 1 illustrates a cube having a dimension 3.

In the preferred embodiment, nodes are assigned unique addresses so that the address of any two nearest neighbor nodes differ by one binary digit. For example, the address of node 0 100 is 000. The address of node 1 101, one of node 0's 100 nearest neighbors, is 001. Therefore, these two nodes' addresses differ only in one binary digit.

The present invention defines the dimension of the channel between any two nodes by taking the binary Exclusive OR of the addresses of the two nodes. After taking the binary Exclusive OR, the bit position remaining a one (bit position 0, 1 or 2 in the case of FIG. 1) is the channel number. For example, after taking the Exclusive OR of 000 and 001, the address of node 0 100 and node 1 101, respectively, the result is 001. As can be seen in the result, bit position 0 is a one. Therefore, these two nodes are connected by a channel being designated as having dimension 0, channel 0 102.

Although the preferred embodiment calculates a relative address at the origin node and transmits the relative address from node-to-node to establish the route, several alternative embodiments are available. For example, in one alternative embodiment, the destination node's absolute address is routed from node-to-node. At each node, the relative address is computed based on the destination node's absolute address and the address of the current node. This relative address is used for determining the channel on which to transmit to the next node.

ROUTER ARCHITECTURE

Figure 2B:
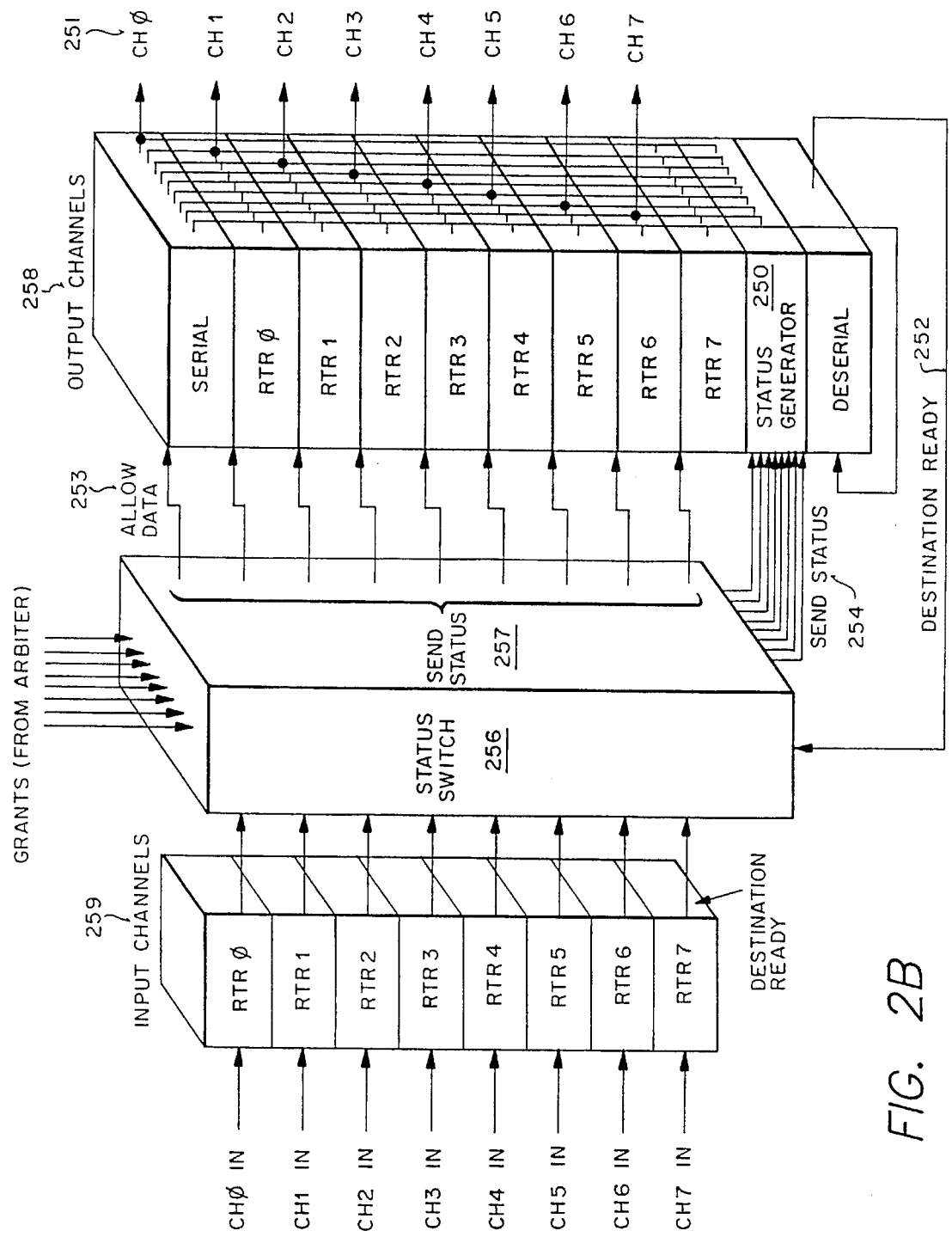
FIG. 2(b) is a block diagram illustrating organization of status route as may be utilized by the present invention.

FIG. 2(a) illustrates a router of the present invention. The router of the preferred embodiment comprises eight independent routing elements 201–208, one for each of eight incoming channels (numbered 0–7) 211–218. The routing elements 201–208 dynamically create message routes through modules of the computer system of the present invention. Each routing element 201–208 is capable of driving several outgoing channels 221–228, one at a time. Since more than one routing element 201–208 may request the same outgoing channel 221–228 simultaneously, an arbitration mechanism 230 is provided for resolving conflicts.

The router of the preferred embodiment further comprises two unidirectional parallel channels, a node source 231 and a node sink 232. Any of the routing elements 201–208 may request the node sink channel 232 for output and, likewise, the node source channel 231 has access to all outgoing channels 221–228.

In the preferred embodiment, the channel 7 routing element 208 operates as a remote I/O port. This provides an I/O gateway into and out of the network for remote devices such as disk farms, graphics devices and real time I/O. In the preferred embodiment, channel 7 of node 0 serves as the host interface. Channel 7 in other nodes is general purpose and used in the currently preferred embodiment as an I/O gateway to disk farms.

As will be explained in more detail below, the present invention provides for routing of a routing probe from a origin node to a destination. The routing of the routing probe acts to reserve a route for subsequent transmission of a message. This reserved route may be referred to as a primary message route.

STATUS ROUTES

In addition to the primary message routes, the preferred embodiment provides a secondary route, referred to as the status route, which routes status information from the destination node to the source node of each message. The status route is used in the preferred embodiment to provide flow control for messages. To pass status information between routers, status information is multiplexed onto the channels during message transmission. In the absence of messages, status information is passed continuously.

To support establishment of status routes, routers of the preferred embodiment comprise "send status" logic. This status logic is illustrated with reference to FIG. 2(b). The "send status" logic allows status information, indicating the destination node is ready to receive a message being routed from the destination node through intermediate nodes back to the origin node. Each router is capable of routing status information for eight simultaneous messages. The "destination ready" status information is passed from the destination node back to the origin node over the same intermediate nodes in the opposite direction from the message.

As discussed above in the preferred embodiment, status information is multiplexed with data during message transmission. As can be seen with reference to FIG. 2(b), send status information is provided from status switch 256 on send status lines 257 to the output channels 258. This status information is multiplexed with the data on channel out lines Ch0–Ch7 251.

In the absence of message traffic, status generator 250 provides status information to be sent out over lines Ch0–Ch7 251. Status generator 250 provides the same send status as provided to the the routers on input channels 259 for all channels that are idle. This status information is provided to status generator 250 over send status lines 254.

It will be apparent to one of ordinary skill in the art that alternative techniques may be utilized for communication of status information. For example, direct wiring of nodes may be utilized for communication of status information. Alternatively, explicit status messages may be transmitted. Each of these techniques will have various advantages and disadvantages.

Responsive to receiving a routing probe at the destination node, the destination ready signal is originated by the destination node, generated by the deserializer and output on line 252. After passing through any intermediate routers, the signal arrives at the source router serializer as an Allow Data control signal on line 253. The Allow Data signal, as the name implies, controls the transmission of data from the source router serializer.

CHANNEL DESCRIPTION

Figure 3:
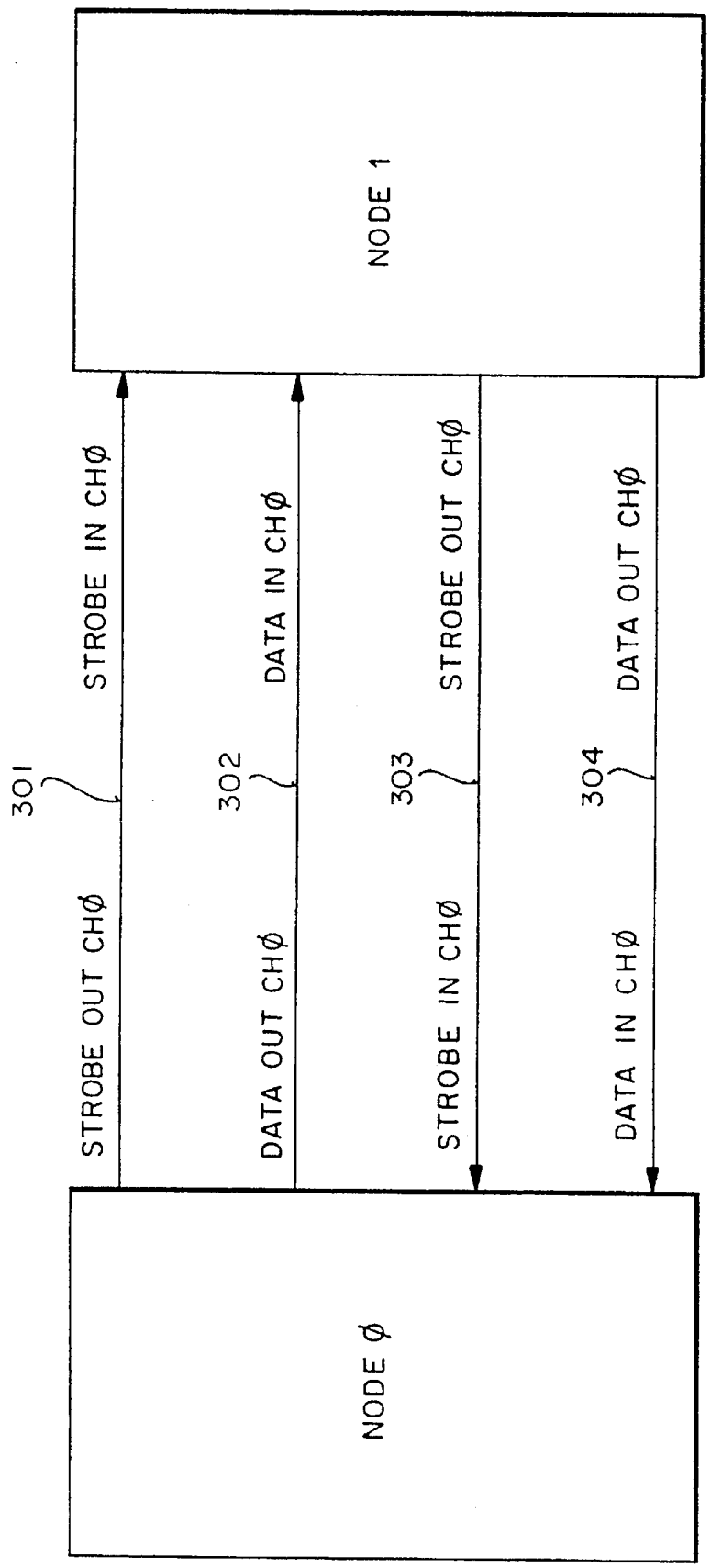
FIG. 3 is a block diagram illustrating a physical channel between nodes of the present invention.

Channels in the preferred embodiment connect a router coupled with a node with each of the node's nearest neighbor's routers. In the preferred embodiment, each channel comprises four conductors 301–304, as shown in FIG. 3. Labelling of the conductors in FIG. 3 may be understood with reference to node 0. Strobe out conductor 301 transmits strobe signals out from node 0. Data out conductors 303 transmit data signals from node 0. Strobe in conductor 303 is coupled to allow node 0 to receive strobe signals. Data in conductors 304 are coupled to allow node 0 to receive data signals. Thus, the conductors 301–304 may be thought of as comprising two pair of conductors for each channel; a first pair comprising strobe out conductors 301 and data out conductors 302 and a second pair comprising strobe in conductors 303 and data in conductors 304. The pairs operate independently of each other.

Figure 4A:
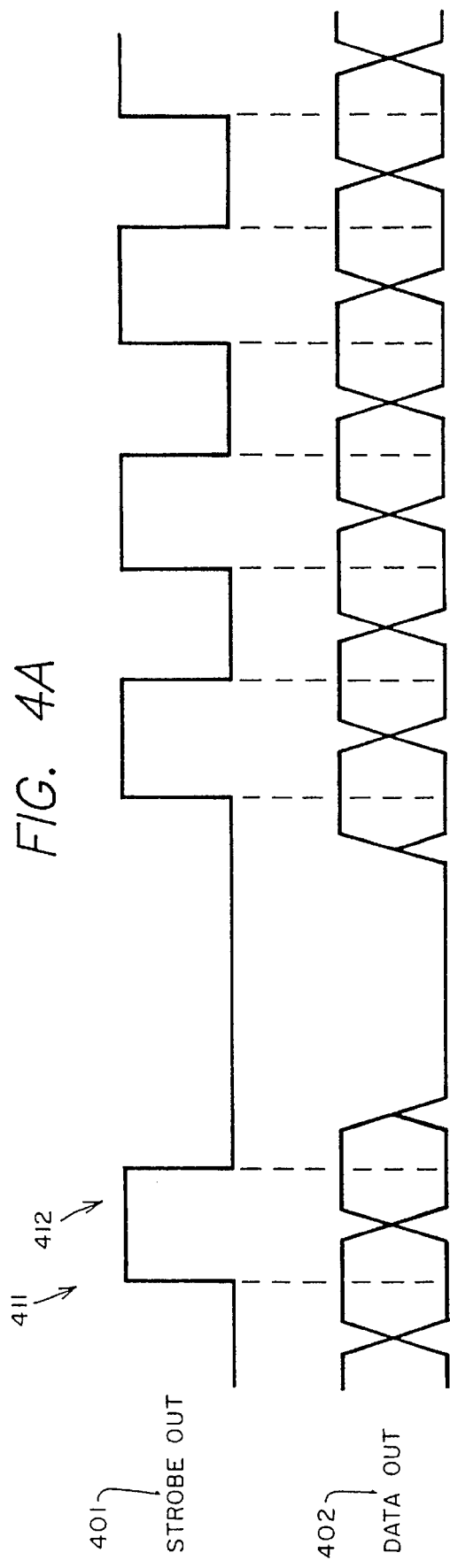
FIG. 4(a) is a timing diagram illustrating channel timing as may be utilized by the present invention.
Figure 4A:
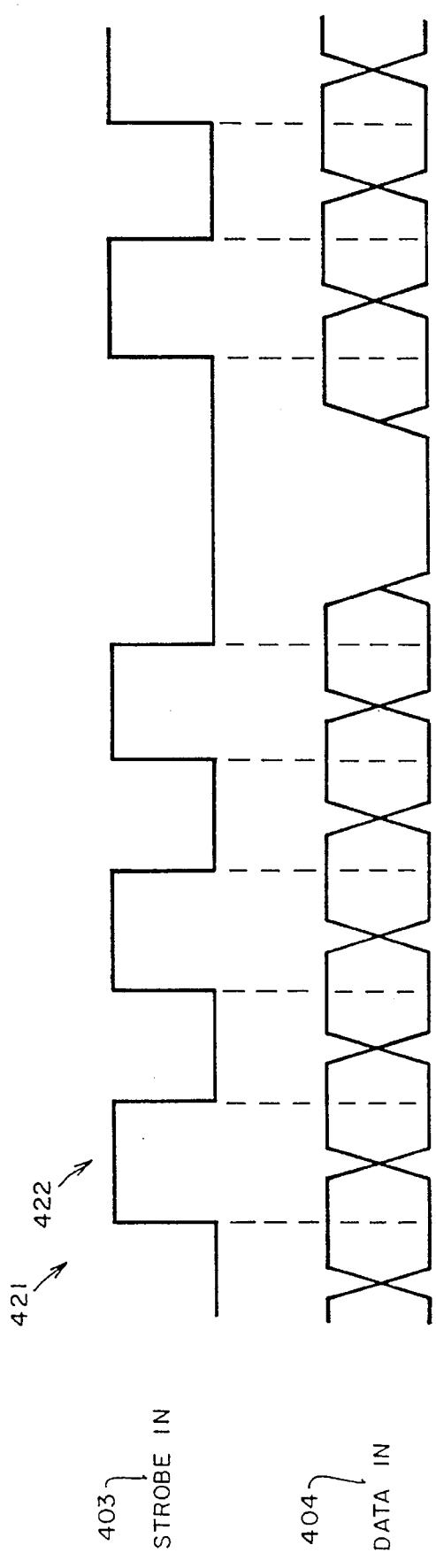

Serial data, control and status bits are transferred across the data lines. The strobe lines are used to validate the data lines and also provide a clock source for the subsequent router. As can be seen with reference to FIG. 4(A), both rising edges, such as edges 411 and 421, and falling edges, such as edges 412 and 422, of strobe signals 401 and 403 are used to validate data lines 402 and 404.

In the present invention, the clock signal communicated over lines 301 and 303 is used to clock the associated data on lines 302 and 304, respectively. This clock signal is transmitted with the data over the entire message route. Using this technique of transmitting a clock signal with a data signal, data may always be controlled by a single clock while each node (and the router associated with the node) may operate on its own clock. A channel at a given node is controlled by the clock signal transmitted with the data it is receiving.

For example, with reference to FIG. 1, assume data is to be communicated from node 4 (address 100) to node 1 (address 001). Taking the Exclusive OR of 100 and 001 yields a relative address of 101. Therefore, the data will be routed from the serializer of node 4 to the channel 0 routing element of node 5. The data will then be routed out of the channel 0 routing element of node 5 on channel 2 to the channel 2 routing element of node 1.

During this process, a clock signal is generated by the serializer on node 4 which is transmitted along with the data over the strobe out line 301 of FIG. 3. This clock signal is received by the channel 0 routing element of node 5 and is used to control the channel 0 routing element. The clock is retransmitted with the data over channel 2 from the channel 0 routing element and is received by the channel 2 routing element of node 1. Thus, the clock follows the data throughout its transmission along the route.

One advantage of the routing technique of the present invention over full handshake protocols is that the technique of the present invention allows for a generally higher data transfer rate. Transfer rates of handshake protocols are generally lower because of latency caused by the required node-to-node acknowledgements and speed degradation as the channels are made physically longer. In the present invention, the use of FIFO buffers at the message destinations and clock signals following data signals throughout data transmission eliminates the need for handshake protocols. Consequently, the throughput is not a function of channel length or acknowledgment delay. The data bandwidth of the preferred embodiment is 2.8 Mbytes/second.

In the present invention, two status/control bits are passed on a continuous repetitive basis between nearest neighbor nodes, whether or not message transmission is occurring. These bits are END OF MESSAGE (EOM) and READY STATUS (RDY). The EOM bit indicates that the last word of the message has been transmitted. This bit is ignored unless a message is in progress. The RDY bit represents the state of readiness of the destination node of an established route.

Figure 4B:
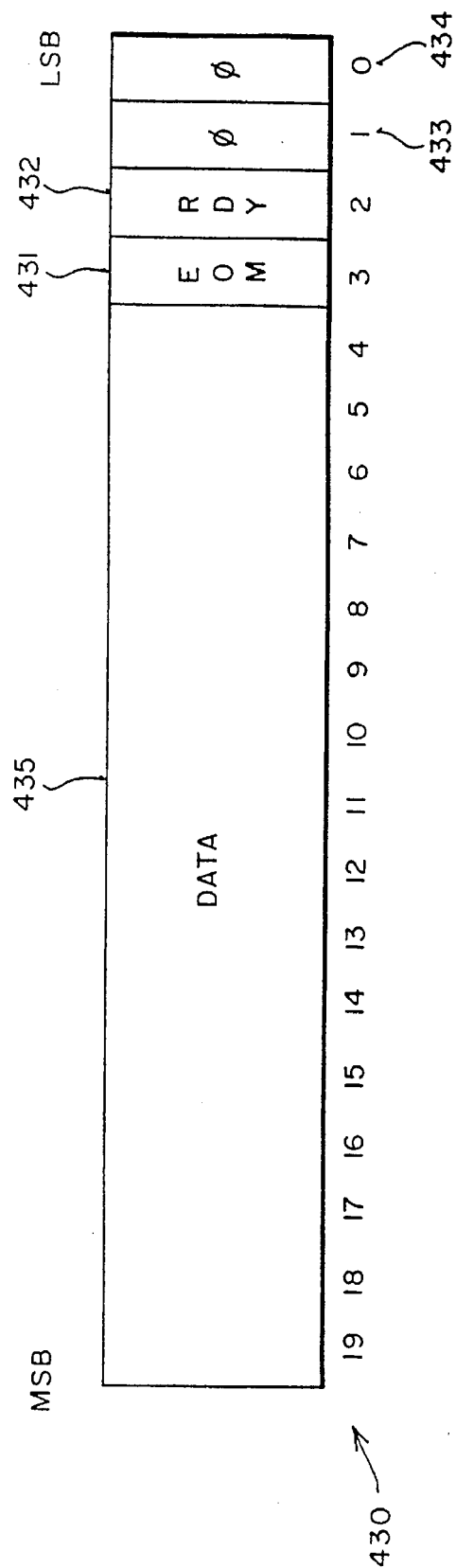
FIG. 4(b) is an illustration of a data format for transmission of data and status information as may be utilized by the present invention.
Figure 4C:
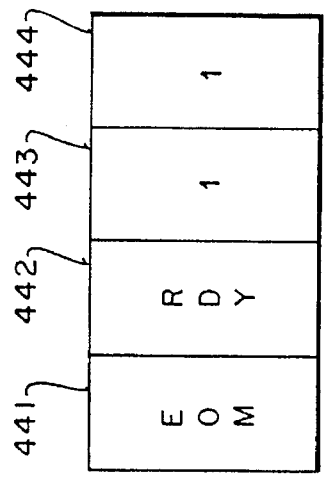
FIG. 4(c) is a illustration of a format for transmission of status information as may be utilized by the present invention.

EOM and RDY bits are passed in one of two formats: (1) a first format, illustrated in FIG. 4(B), allows the EOM bit 431 and RDY bit 432 to be interspersed within a data message 430 and (2) a second format, illustrated in FIG. 4(C), allows EOM bit 441 and RDY bit 442 to be passed in the absence of message traffic.

The first format comprises, in addition to the above-mentioned EOM bit 431 and RDY bit 432, two bits 433 and 434 for indicating the transfer is a data message transfer and sixteen data bits 435. In the preferred embodiment, the two bits 433 and 434 are set to 0 to indicate the message is a data transfer message.

The second format, referred to as a "status nibble", comprises four bits, the EOM bit 441, the RDY bit 442 and two bits 443 and 444 for indicating the format is a status only transfer. In the preferred embodiment, these two bits 443 and 444 are set to 1. During transmission of status nibbles, the EOM bit is ignored. Status nibbles are repetitively transmitted by all routers in the absence of a data transfer.

The RDY bit is stored as it is received at each router in a "Destination Ready" register and is used for flow control in the system as described above.

As described above, the present invention utilizes two "start bits", 433 and 434 or 443 and 444, on both the status and data formats. Two bits are utilized because the message is processed in two halves by the routers. Odd numbered bits are processed independently from the even numbered bits in the router. This allows for higher data transfer rates than otherwise possible in the the gate arrays of the preferred embodiment.

As one advantage of status information being interspersed with message data in the message format of the present invention, the end of a message can easily be detected by routers on the fly. This eliminates the need for a message size counter in the routers and, thereby, removes any limits to maximum message size. Therefore, messages in the present invention may be of any arbitrary size.

Each message in the present invention involves one sending node and one receiving node. The routes that messages take through the network are unique between any two nodes. The combination of channels that compose a route are defined by the binary-cube routing algorithm as described by Herbert Sullivan and T. R. Bashkow, A Large Scale Homogeneous, Fully Distributed Parallel Machine, *Proceedings of the 4th Annual Symposium on Computer Architecture*, pp. 105–117, 1977. This algorithm is further described with reference to C. R. Lang, Jr., The Extension of Object-Oriented Languages to a Homogeneous, Concurrent Architecture, *Department of Computer Science, California Institute of Technology, Technical Report Number* 5014, May 1982. Using such a binary-cube algorithm guarantees that no circular routes will occur in the message routing and, thus, prevents deadlock from occurring.

The algorithm states that in order to guarantee against deadlock, messages in binary cubes can be routed in increasingly higher dimensions until the destination is reached. The channel numbering defined above corresponds to these dimension. Routes may consist of increasingly higher numbered channels, but are not necessarily contiguous. Routing of messages from higher numbered channels to lower numbered channels (or channels of the same dimension) is not allowed. For instance, a route may consist of channel 0—channel 2—channel 3 which involves the routers of nodes 0, 1, 5 and 13. In this case the source router is at node 0, the intermediate routers are at nodes 1 and 5 and the destination router is at node 13.

A routing operation of the present invention can be broken into four phases: establishing a route, acknowledgement of the destination node being ready to receive a message, message transmission and releasing connections. To initiate the routing of a message, the source node transfers a minimum of one 32 bit word to the its router. The low order 16 bits of this first 32 bit word comprise a routing probe. The routing probe comprises addressing information and is used to establish the connections through intermediate routers which make up the route that the message takes. In the preferred embodiment, the high order eight bits of the routing probe are set to zeros.

The low order eight bits of the routing probe are calculated by taking the Exclusive OR of the binary address of the destination node and the source node. Each bit of the routing probe corresponds to a channel that the message can be routed on. (The preferred embodiment comprises a 7-dimensional binary cube, the eighth bit is used for addressing the external I/O channel.)

The first segment of the route is established when the serializer in the source router requests the outgoing channel that corresponds to the lowest order bit set in the routing probe. Requests for the same channel are arbitrated among local requestors by the arbiter. The arbiter grants one request at a time, using a "round robin" arbitration scheme. When the channel is granted, the routing probe is sent by the source router before any message transmission takes place.

For example, if a routing probe is transferred to the router in which bit N is the lowest order bit set, channel N will be requested. When the arbiter grants channel N, the routing probe will be transmitted to the intermediate router that is the nearest neighbor to the source node on channel N.

In the preferred embodiment, upon receiving the routing probe, the intermediate router stores the routing probe and discards the high order 8 bits (all of which are zeroes), thus creating a short routing probe. The discarded bits will be reconstructed at the destination router. The short routing probe is passed between intermediate routers, reserving additional segments of the route.

Figure 5:
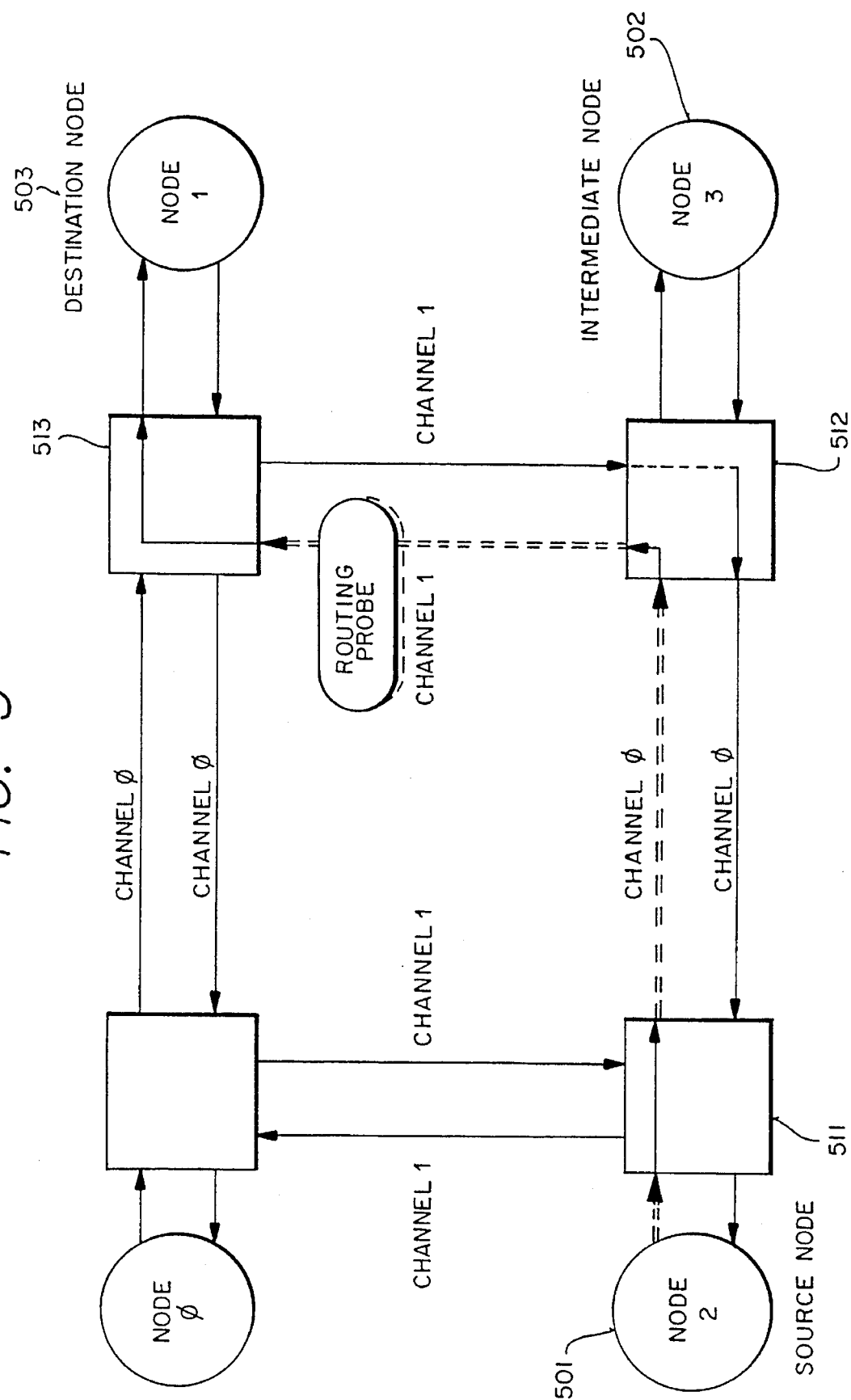
FIG. 5 is a diagram illustrating establishment of a communication route in a networked computer system as may be accomplished by the present invention.

The intermediate routers examine bits N+1 to bit 7 of the short routing probe to determine the lowest order bit that is set. The outgoing channel, corresponding to the the first bit that is set, will be requested and the short routing probe will wait. When the outgoing channel is granted, the short routing probe is transmitted to the next router in the route. As illustrated in FIG. 5, this process repeats until the routing probe is received by the destination router.

Referring to FIG. 5, a message is to be transmitted from source node 2 (binary address 10) 501 to destination node 1 (binary address 01) 503 in a 2-dimensional cube. The source node 501 transfers a routing probe to its router 511. As described above, the routing probe comprises the relative address of the source and destination nodes; thus, in the example in FIG. 5, the routing probe contains the address 11 (10 XOR 01=11). In this case, bit zero, corresponding to channel 0, is 1. Thus, as described above, the routed probe requests channel 0 for transmission.

When the routing probe is granted access to channel 0, the routing probe is sent over channel 0 to router 512 corresponding to intermediate node 502. As described above, the routing algorithm of the present invention requires router 512 to send the routing probe out on a channel of higher dimension than it was received on. Therefore, router 512 begins examining bits of the router probe for 1 bits beginning with the bit in bit position 1 (the routing probe was received by router 512 on channel 0). After finding the first 1 bit, a request is made for the channel corresponding to the 1 bit. In this particular example, the first 1 bit is in bit position 1 and a request is made for channel 1.

The routing probe is transmitted on channel 1 to router 513 corresponding with destination node 503. Router 513 examines the routing probe beginning with the bits of higher dimension than the channel the routing probe was received on. In the illustrated example, all remaining bits are 0. Therefore, router 513 determines the routing probe has reached it final destination.

Router 513 pads the routing probe with eight zeros to restore it to its original state. If the destination router can accept a message, it will signal an acknowledgement (the RDY bit).

This begins the acknowledgement phase of the routing operation. The acknowledgement phase requires that a deterministic connection be made from the destination router back to the source router for the purpose of carrying flow control information. This is termed the "Status route" and follows exactly through the same intermediate nodes as the message route, but in the opposite direction from the destination node to the source node.

For example, if a message routed from CHANNEL 2 IN to CHANNEL 4 OUT at an intermediate router, a connection from CHANNEL 4 IN to CHANNEL 2 OUT is made for the status route. The status route, like the message route, maintains its connection for the duration of the message.

Figure 6:
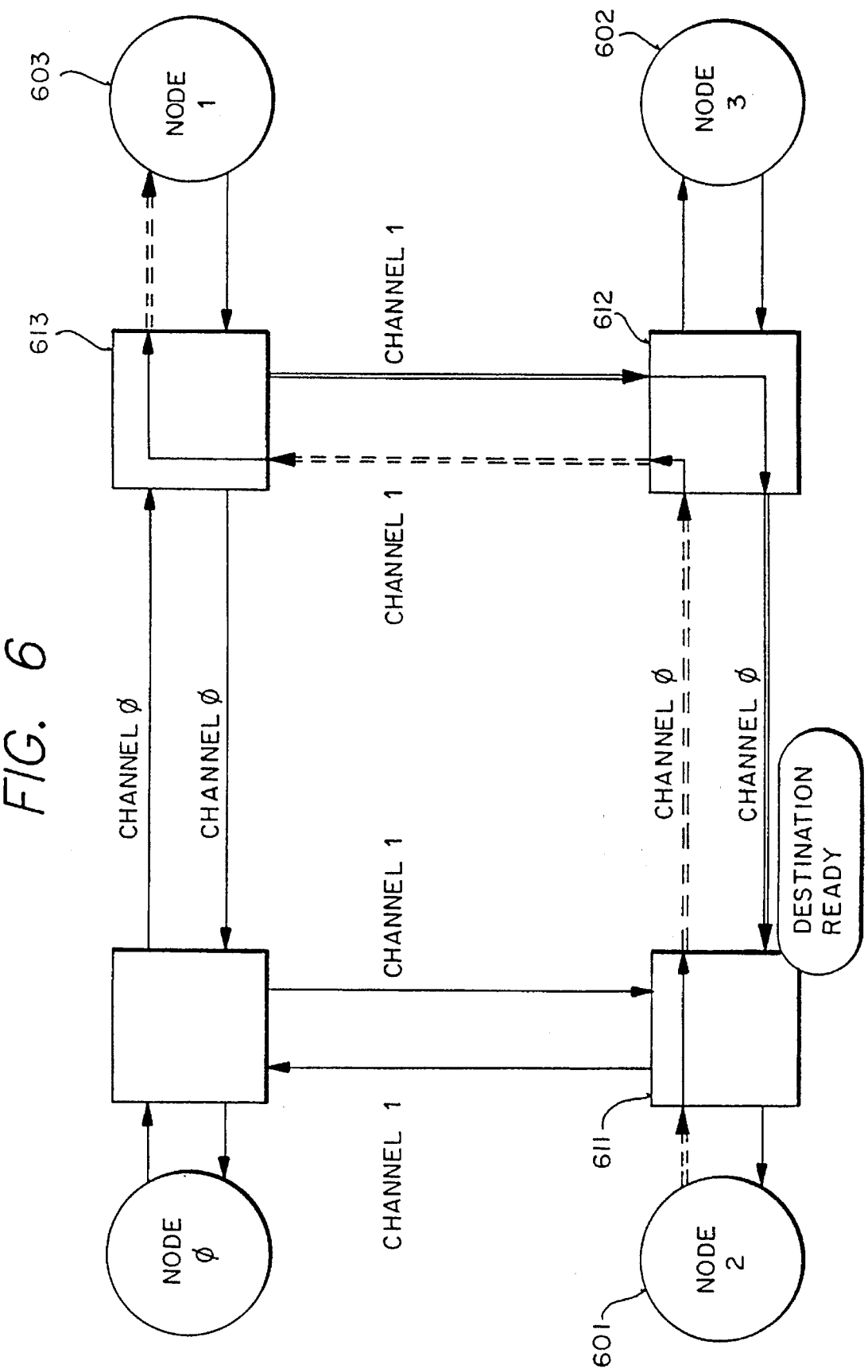
FIG. 6 is a diagram illustrating acknowledgement of establishment of a route in networked computer system as may be accomplished by the present invention.
Figure 7:
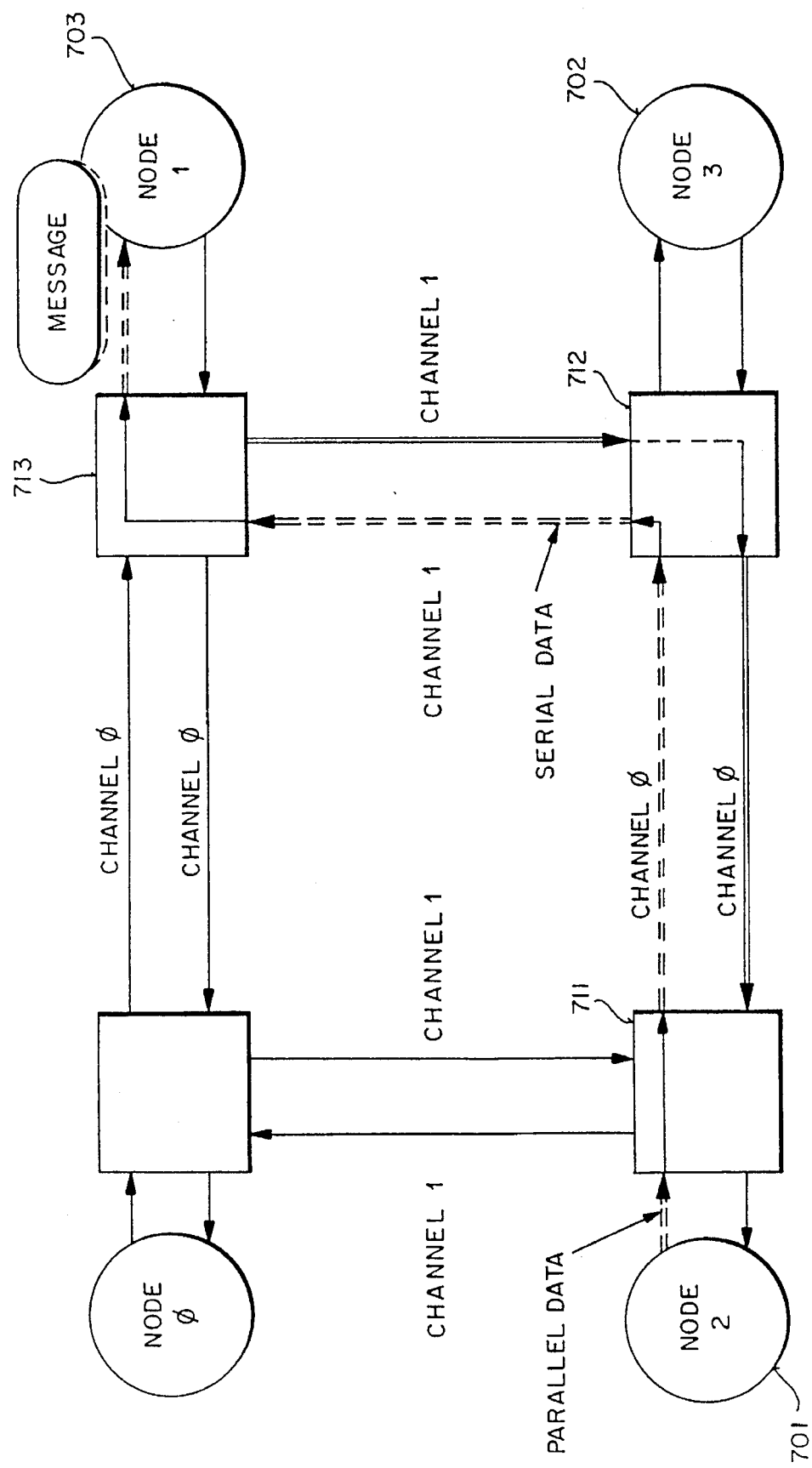
FIG. 7 is a diagram illustrating message transmission in a networked computer system as may be accomplished by the present invention.
Figure 8:
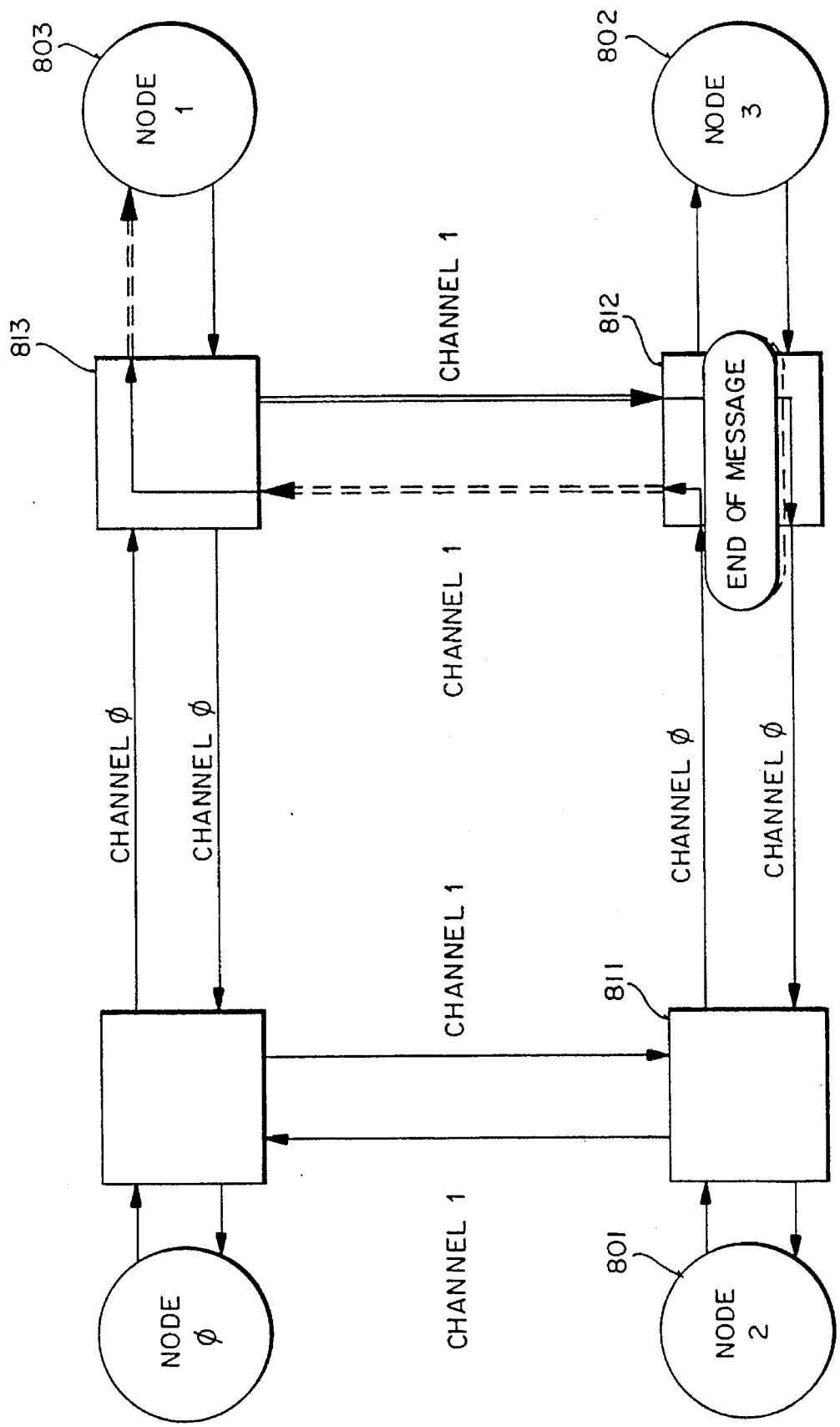
FIG. 8 is a diagram illustrating release of a route in a networked computer system as may be accomplished by the present invention.

FIG. 6 illustrates the acknowledgement phase of the routing operation of the present invention. In FIG. 6, node 601 corresponds to node 501 of FIG. 5; router 611 corresponds to router 511; node 602 corresponds to node 502, etc. FIGS. 7 and 8 have similar labelling correspondence.

As shown by FIG. 6, an acknowledgement is sent from router 613 (corresponding with destination node 1 603) over channel 1 to intermediate router 612. Intermediate router 612 forwards to acknowledgement to origin router 611 over channel 0 where it is received by node 2 601. As will be understood by one of ordinary skill in the art, RDY status information is transmitted in the formats discussed above. Therefore, message information from a different origin node may be transmitted simultaneously with the status information over the same channel. If there are no requests to use the same channel, a status nibble (discussed above) is transmitted.

When the RDY bit finally reaches the source node 601, the message transmission phase begins. The source ROUTER can transmit data continuously into the network (in the format described above) until the end of the message is sent or a not ready indication is received over the status route. In the preferred embodiment, messages are not buffered in the intermediate routers.

As can be seen with reference to FIG. 7, the message information is transmitted from node 2 701 to router 711 and then out the serializer of router 711. The message information is then transmitted over the reserved route (CHANNEL 0 to intermediate router 712, CHANNEL 1 to destination router 713). The message is then deserialized at router 713 and transmitted to destination node 703.

If, during transmission of the message, the source router 711 receives a not ready indication on incoming channel 0, it will discontinue transmission of the message and transmit status nibbles. When a ready indication is again received on incoming channel 0, the source router will again begin transmission of the message. In the preferred embodiment, the destination router stores any message information which is in transit at the time the not ready indication is active. Therefore, when a message is throttled by a not ready indication, no data bits remain stored on the network, but rather are stored in the FIFO buffer of the destination router. This method of throttling message transmission by receiving an indication the destination node is not ready and suspending transmission of the message in response to such an indication provides for flow control in the network of the present invention.

After completion of transmission of a message, the source router appends a checksum word to the message. The data format which contains the checksum word has the EOM bit set. The checksum provides a means to verify message integrity in order to detect hardware failures should they occur.

As shown in FIG. 8, the transmission of a word with the EOM bit set causes the source router 811 to release the outgoing channel (channel 0) reserved for the message. At each intermediate router in the route (router 812 in the illustrated example), the channel reserved for the message is released when the word with the EOM bit set is retransmitted. Those channels are then free to be used for other messages.

When a word with the EOM bit set is received at the destination router 813, it is assumed that the accompanying data information is the checksum for the message. The checksum information is used to verify the integrity of the message. Since the checksum information is not part of the original message, it is stripped off by the destination router 813. The result is stored for further inspection at the destination node 803.

Figure 9:
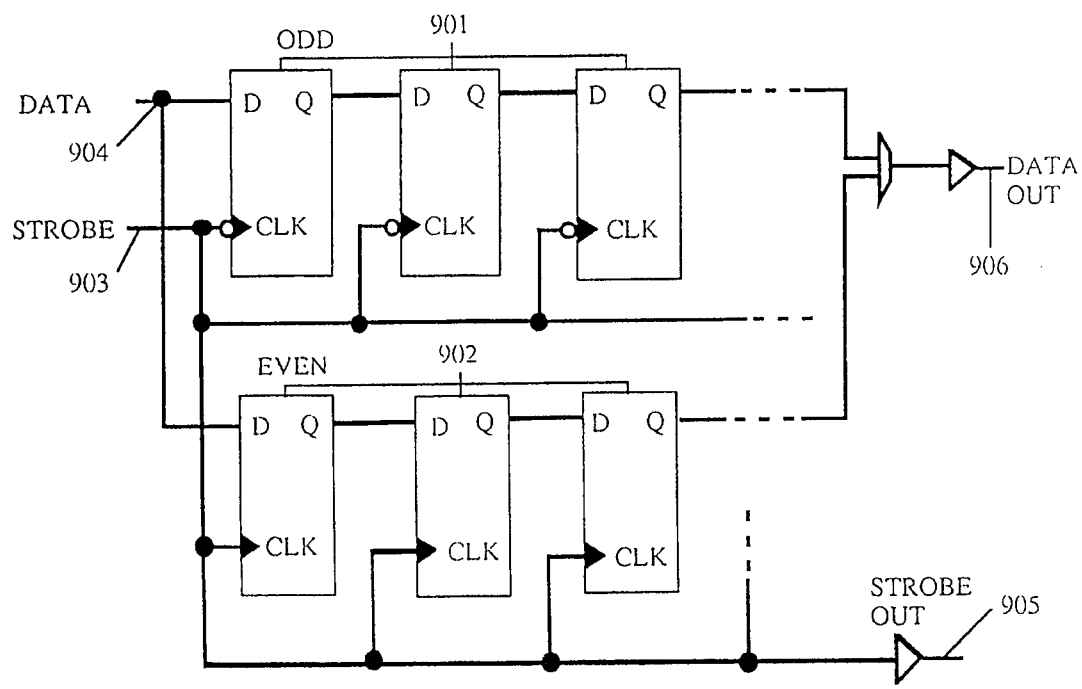
FIG. 9 illustrates the data latching circuitry in a typical router of the invention described in the parent patent application.

As described earlier, strobe lines are used to validate data lines and also to provide a clock source for a subsequent router. Both rising edges and falling edges are used to validate data. Rising and falling edges may be denoted as even and odd edges, since the direction of the strobe's transition can be equivalently implemented in either direction. FIG. 9 illustrates a system using a strobe in this manner. Referring to FIG. 9, a plurality of latches (901, 902) is depicted. These latches are used to hold the routing probe as it is received by the router. Each latch is coupled to a strobe line 903 an a data line 904 as shown in FIG. 9. The plurality of latches (901, 902) is logically divided into two banks; an odd bank 901 triggered on an odd edge of the store signal appearing on strobe line 903 and and even bank 902 triggered on an even edge of the strobe signal. In this way, bits of the routing probe can be latched in and stored on both rising and falling edges of the strobe. The strobe signal on strobe line 903 is amplified to produce a strobe out signal 905 which is coupled to each of the routers in the network. This common clock signal is used to provide a synchronous data transfer between routers.

The system for connecting a plurality of routers to a common strobe line as depicted in FIG. 9 may be subject to a limitation on the number of routers thus connected. After the strobe signal on strobe line 903 is supplied to and amplified by a number of routers, the strobe signal may be subject to pulse shrinkage. Pulse shrinkage occurs when a signal is buffered through devices that have unequal rise and fall times. Pulse shrinkage can cause severe asymmetry in the strobe signal and ultimately can cause data errors.

Figure 10:
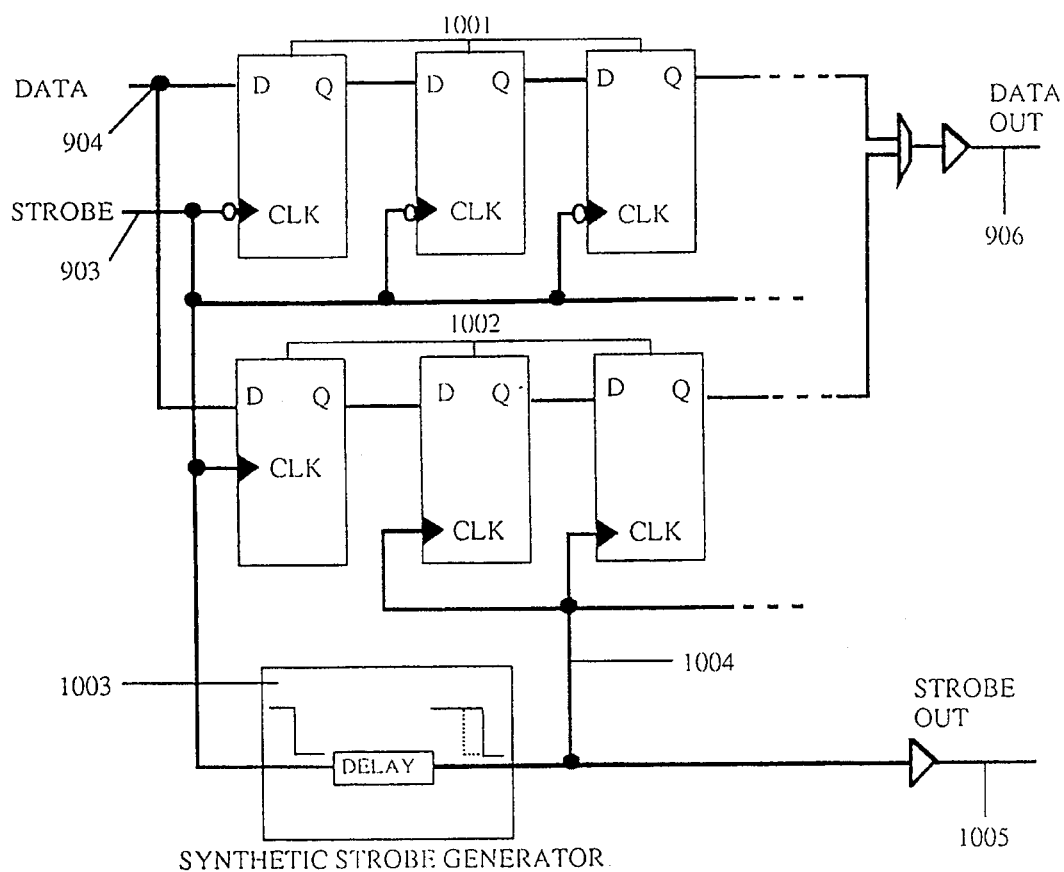
FIG. 10 illustrates a first embodiment of a router of the present invention including synthetic clock generator circuitry for regenerating the strobe signal.
Figure 11:
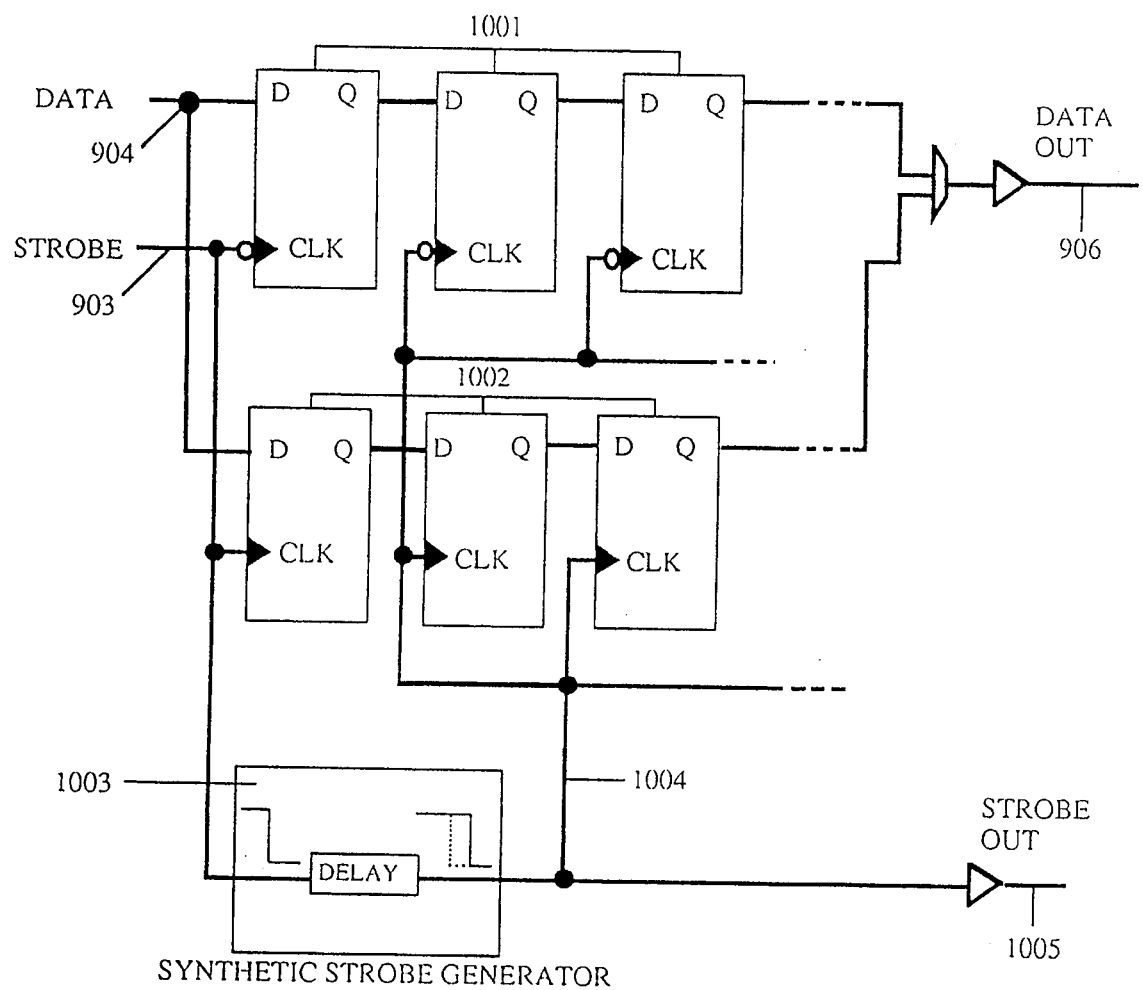
FIG. 11 illustrates a second embodiment of a router of the present invention including synthetic clock generator circuitry for regenerating the strobe signal.

Referring to FIGS. 10 and 11, an improved method for providing a common strobe signal to a plurality of routers is illustrated. This improved means and method is denoted herein as alternate edge strobe regeneration. The alternate edge regeneration circuit eliminates the pulse shrinkage problem by regenerating every other edge of the strobe signal as it is routed through each router. All even edges of the strobe signal are modified by the routing hardware while odd edges of the strobe are sent unmodified to the next router. It will be apparent to those skilled in the art that odd edges may coincide with rising edges of a signal while even edges may correspond to the falling edge of a signal. Similarly, the reverse configuration may equivalently be implemented; that is, even edges may coincide with rising edges of a signal while odd edges may correspond to the falling edge of a signal.

FIG. 10 illustrates a first alternative embodiment of alternate edge strobe regeneration. FIG. 11 illustrates a second alternative embodiment of alternate edge strobe regeneration.

Referring to FIG. 10, a plurality of latches (1001 and 1002) is shown. These latches are similar to those depicted in FIG. 9 and used for receiving and storing the routing probe. As in FIG. 9, data line 904 is coupled to each latch. Strobe line 903 is connected to latches 1001 and 1002 and a synthetic clock generator circuit 1003 in two equivalent ways as depicted in a first embodiment illustrated in FIG. 10 and a second embodiment illustrated in FIG. 11. The improved system includes a synthetic clock generator circuit 1003 used for modifying the strobe signal transmitted on strobe line 903. The design and operation of synthetic clock generator 1003 is described below and illustrated in FIG. 12.

Referring again to FIG. 10, strobe line 903 is coupled directly to odd latches 1001 and directly to synthetic clock generator 1003. Strobe line 903 is also directly connected to the first even latch of the set of even latches 1002. The remaining even latches 1002 are coupled to the output side 1004 of synthetic clock generator circuit 1003. By coupling the latches to strobe line 903 as depicted in FIG. 10, the odd edges of the strobe signal drive latches 1001 as directly received on strobe line 903 while the modified even edges produced by the synthetic clock generator 1003 drive all but the first of the even latches 1002. Similarly, the modified even edges of the strobe signal as output by the synthetic clock generator 1003 are amplified to produce a strobe out signal 1005 which are then sent on to the next router. This method of modifying the strobe signal using alternate edge regeneration eliminates pulse shrinkage.

Referring now to FIG. 11, a second alternative embodiment of the strobe connection is illustrated. In FIG. 11, strobe line 903 is directly connected to synthetic clock generator 1003. In addition, strobe line 903 is directly connected to the first odd latch of the set of odd latches 1001 and the first even latch of the set of even latches 1002. Thereafter, all latches on the odd side 1001 and on the even side 1002 are connected to the output side 1004 of synthetic clock generator 1003. As configured in this second embodiment, as illustrated in FIG. 11, both the unmodified odd edge of the strobe signal and the modified even edge of the strobe signal are supplied by the output side 1004 of synthetic clock generator 1003. This second embodiment is functionally equivalent to the first embodiment depicted in FIG. 10. The modified strobe signal is amplified to produce a strobe out signal 1005 which is passed on to the next router. Using the configuration of either the first or second embodiments, the synthetic clock generator 1003 operates to prevent pulse shrinkage of the strobe signal from corrupting data received by latches 1001 and 1002 in each router of the network.

Figure 12:
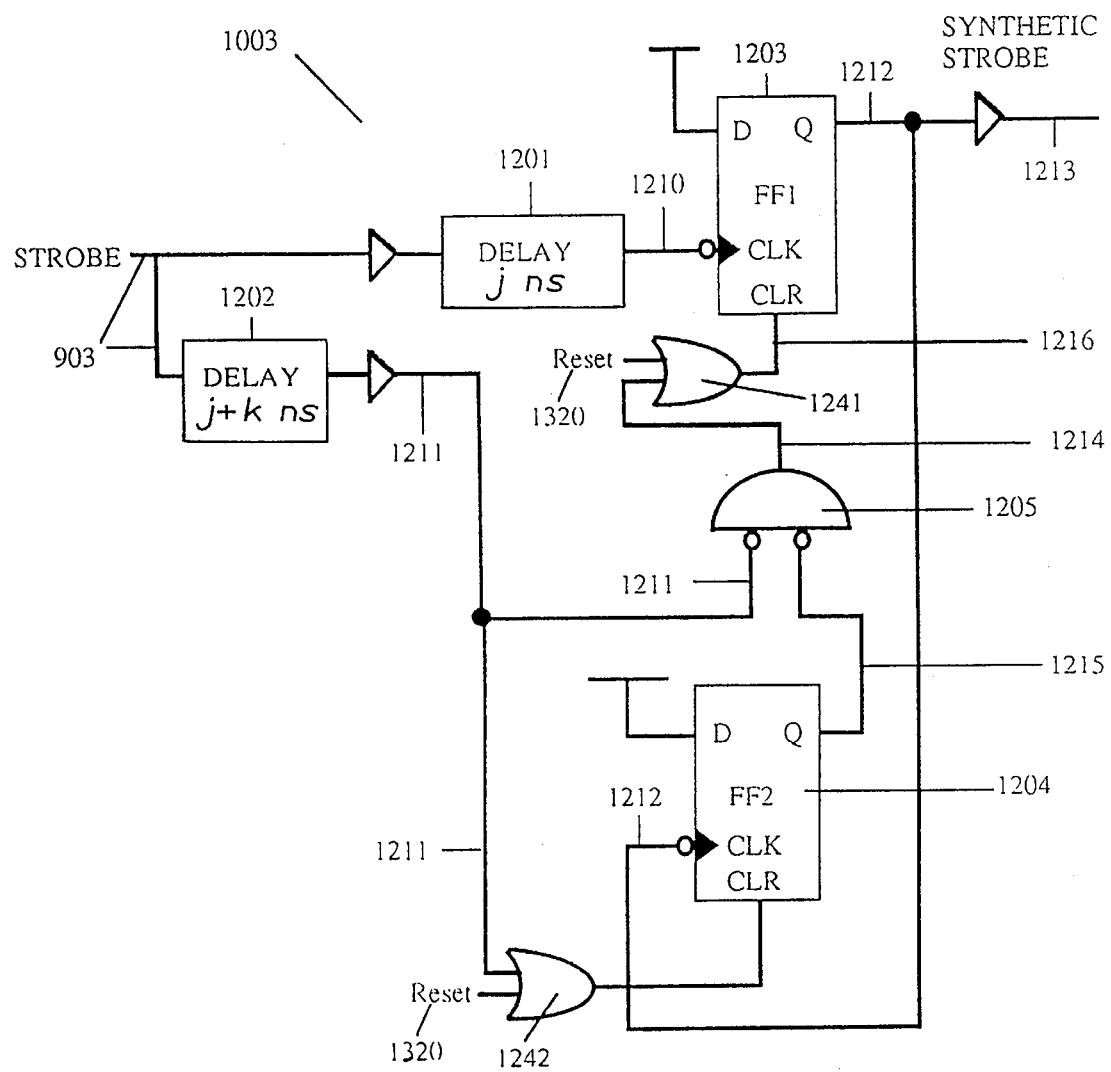
FIG. 12 illustrates a preferred embodiment of the synthetic clock generator circuitry of the present invention.

Referring now to FIG. 12, a preferred embodiment of the synthetic clock generator circuit 1003 is illustrated. The circuit 1003 includes delay devices, flip-flop devices, and logic devices each of which are independently well known in the art. Strobe line 903 provides the single input to synthetic clock generator 1003. In the preferred embodiment of the present invention, the strobe signal carried on strobe line 903 is an active low signal that initiates an active pulse by the occurrence of a falling edge. It will be apparent to those skilled in the art that an equivalent alternative embodiment may be implemented where the strobe signal is an active high signal where an active pulse is initiated by a rising edge.

Initially, flip-flop devices FF1 1203 and FF2 1204 are in a reset condition after a reset signal 1320 is applied to the clear input of both flip-flops 1203 and 1204. Both FF1 and FF2 output a low Q signal when reset. Since the Q output 1215 of FF2 1204 is low and the signal on line 1211 is initially high, the output of gate 1205 is low. Thus, once the reset signal 1320 is removed (goes low), the clear input 1216 to FF1 1203 becomes inactive. A timing diagram depiction of reset signal 1320 is depicted in FIG. 13.

Referring again to FIG. 12 and FIG. 13, the strobe signal on strobe line 903 is initially in a high state. Thus, after the strobe signal is inverted on the clock input to FF1 1203, the output Q 1212 of FF1 1203 remains in a reset state. Delay components 1201 and 1202 are used for delaying both the rising and the falling (odd and even) edges of a signal as it passes through the component. The delay components 1201 and 1202 are well known to those of ordinary skill in the art.

When a falling edge 1302 occurs on strobe line 903, both delay component 1201 and delay component 1202 receive the falling edge at nearly the same time. After a delay of j nanoseconds (j and k are positive numbers), the clock signal 1210 applied to FF1 1203 transitions to an active state thereby causing the Q output 1212 of FF1 1203 to transition to a high state as shown by rising edge 1304 in FIG. 13.

Referring again to FIG. 12, the output Q 1212 of FF1 1203 is also inverted and received by the clock input of FF2 1204. When the output Q 1212 of FF1 1203 goes to a low state, the clock input 1212 to FF2 1204 becomes active. However, when the clear input 1211 to FF2 1204 is high, the Q output 1215 of FF2 1204 remains low.

After a delay of j+k nanoseconds referenced from the time of the falling edge 1302 on the strobe signal 903, a falling edge appears on the output side 1211 of delay 1202. This falling edge signal on line 1211 is supplied to both gate 1205 and the clear input to FF2 1204. As the signal on line 1211 transitions to a low state, both inputs to gate 1205 are low. Since both inputs to gate 1205 are low, the output 1214 produced by gate 1205 transitions to a high state. This high state on line 1214 is passed through gate 1241 and serves to clear FF1 1203 thereby causing a transition at the Q output 1212 of FF1 1203 from a high state to a low state. Thus, a falling edge appears on synthetic strobe output 1213. This synthetic falling edge 1306 is depicted in FIG. 13. Since the clear input to FF2 1204 is inactive and the clock input 1212 is now active, the Q output 1215 of FF2 1204 transitions to a high state. This transition serves to render inactive the clear signal 1216 to FF1 1203 so that it is not active when the next rising transition on line 1210 is received.

Thus, summarizing the operation of the circuit depicted in FIG. 12, a falling edge on strobe line 903 causes the output Q 1212 of FF1 1203 to rise after j nanoseconds. This can occur because the clear input to FF1 1203 is disabled. After j+k nanoseconds, the signal on line 1211 supplied to gate 1205 transitions to a low state thereby setting the clear input 1216 to FF1 1203. This clear signal serves to reset FF1 1203 causing the synthetic falling edge to appear on synthetic strobe output line 1213. FF2 1204 then degates the clear signal to FF1 1203 ensuring that FF1 1203 can respond to the next strobe low-to-high transition.

Using a preferred embodiment of the synthetic clock generator circuit as depicted in FIG. 12 and described above, a synchronous strobe signal can be supplied to an unlimited number of routers in a parallel processing network without the danger of experiencing data loss due to a pulse shrinkage condition occurring on the strobe line.

Thus, an improved parallel processing computer system with alternate edge strobe regeneration is described. Although the present invention has been described with specific reference to a number of details of the preferred embodiment, it will be apparent that a number of modifications and variations may be employed without departure from the scope and spirit of the present invention. Accordingly, all such variations and modifications are included within the intended scope of the invention as defined by the following claims.

I claim:

1. A computer system having a source node coupled to a destination node through at least one intermediate node, said at least one intermediate node comprising:

a processor;

a router coupled to said processor, for routing messages between said nodes, said router including:
   (a) data communication means for receiving and retransmitting data to a next router coupled to said router;
   (b) strobe communication means coupled to said data communication means, for receiving a plurality of clock signals and transmitting a modified plurality of clock signals to said next router, each of said plurality of clock signals having odd and even edges, at least one edge of said modified plurality of clock signals clocking said data retransmitted to said next router, said strobe communication means generating each even edge of said modified plurality of clock signals by delaying a corresponding odd edge of said plurality of clock signals.

2. The computer system of claim 1, wherein an odd portion of said data is clocked by odd edges of said plurality of clock signals and an even portion of said data is clocked by even edges of said modified plurality of clock signals.

3. The computer system as claimed in claim 2 said data communication means further including:

even latching means for receiving an even portion of said data and said modified plurality of clock signals, said even latching means being clocked by even edges of said modified plurality of clock signals and being coupled to said strobe communication means; and odd latching means for receiving an odd portion of said data and said plurality of clock signals, said odd latching means being clocked by odd edges of said plurality of clock signals and being coupled to said strobe communication means.

4. The computer system of claim 1, wherein said data is clocked on both odd and even edges of said modified plurality of clock signals, each odd edge of said modified plurality of clock signals being a substantially unmodified version of a corresponding odd edge of said plurality of clock signals, said strobe communication means including means for generating each even edge of said modified plurality of clock signals by delaying said corresponding odd edge of said plurality of clock signals.

5. The computer system as claimed in claim 4, said data communication means further including:

even latching means for receiving an even portion of said data and said modified plurality of clock signals, said even latching means being clocked by even edges of said modified plurality of clock signals and being coupled to said strobe communication means; and odd latching means for receiving an odd portion of said data and said modified plurality of clock signals, said odd latching means being clocked by odd edges of said modified plurality of clock signals and being coupled to said strobe communication means.

6. A computer system having a source node coupled to a destination node through at least one intermediate node, said at least one intermediate node comprising:

a processor;

a router coupled to said processor, said router transfers messages between said nodes, said router including:

(a) data communication circuitry that receives and retransmits data to a next router coupled to said router;

(b) strobe communication circuitry coupled to said data communication circuitry, said strobe communication circuitry receives a plurality of clock signals and transmits a modified plurality of clock signals to said next router, each of said plurality of clock signals having odd and even edges, at least one edge of said modified plurality of clock signals clocking said data retransmitted to said next router, said strobe communication circuitry further generates each even edge of said modified plurality of clock signals by delaying a corresponding odd edge of said plurality of clock signals.

7. The computer system of claim 6, wherein an odd portion of said data is clocked by odd edges of said plurality of clock signals and an even portion of said data is clocked by even edges of said modified plurality of clock signals.

8. The computer system of claim 7, said data communication circuitry further including;

even latching circuitry coupled to said strobe communication circuitry, said even latching circuitry receives an even portion of said data and said modified plurality of clock signals, said even latching circuitry being clocked by even edges of said modified plurality of clock signals; and odd latching circuitry coupled to said strobe communication circuitry, said odd latching circuitry receives an odd portion of said data and said plurality of clock signals, said odd latching circuitry being clocked by odd edges of said plurality of clock signals.

9. The computer system of claim 6, wherein said data is clocked on both odd and even edges of said modified plurality of clock signals, each odd edge of said modified plurality of clock signals being a substantially unmodified version of a corresponding odd edge of said plurality of clock signals, said strobe communication circuitry includes circuitry that generates each even edge of said modified plurality of clock signals by delaying said corresponding odd edge of said plurality of clock signals.

10. The computer system as claimed in claim 9, said data communication circuitry further including:

even latching circuitry coupled to said strobe communication circuitry, said even latching circuitry receives an even portion of said data and said modified plurality of clock signals, said even latching circuitry being clocked by even edges of said modified plurality of clock signals; and odd latching circuitry coupled to said strobe communication circuitry, said odd latching circuitry receives an odd portion of said data and said modified plurality of clock signals, said odd latching circuitry being clocked by odd edges of said modified plurality of clock signals.

11. A parallel processing computer system having a plurality of nodes for processing information, said plurality of nodes interconnected in a binary n-cube, each of said nodes coupled with adjacent nodes for providing a communication route between said nodes, each of said communication routes comprising:

a first line for routing information from a first node to a second node;

a second line for communicating a plurality of clock signals having alternate edges between said first node and said second node, said plurality of clock signals are used to clock said information; and alternate edge strobe regeneration means for regenerating each alternate portion of said plurality of clock signals, said alternate edge strobe regeneration means being implemented in each of said nodes and coupled to said second line.

12. A parallel processing computer system having a plurality of nodes that processes information, said plurality of nodes interconnected in a binary n-cube, each of said nodes coupled with adjacent nodes to provide a communication route between said nodes, each of said communication routes comprising:

a first line that routes information from a first node to a second node;

a second line that transfers a plurality of clock signals between said first node and said second node, said plurality of clock signals are used to clock said information; and alternate edge strobe regeneration circuitry in each of said nodes and coupled to said second line, said alternate edge strobe regeneration circuitry regenerates each alternate portion of said plurality of clock signals.

13. In a computer system having a source node coupled to a destination node through at least one intermediate node, each of said nodes having a processor for processing information and a router for routing information between nodes, each router having a clock regeneration circuitry for modifying a plurality of clock signals each having odd and even edges, a process for communicating information from said source node to said destination node comprising the steps of:

(a) transferring data and said plurality of clock signals from a first adjacent router to an intermediate router of at least one said intermediate node, said first adjacent router coupled to a first adjacent node;

(b) delaying each odd edge of said plurality of clock signals to generate a corresponding even edge of a modified plurality of clock signals; and (c) transmitting data clocked by at least one edge of said modified plurality of clock signals to a second adjacent router, said second adjacent router coupled to a second adjacent node.

14. The process as claimed in claim 13 further including the steps of:

latching an even portion of said data communicated to said intermediate router, said even latching step clocked using each even edge of said modified plurality of clock signals;

latching an odd portion of said data communicated to said intermediate router, said odd latching step clocked using each odd edge of said plurality of clock signals.

15. The process as claimed in claim 13 further including the steps of:

latching an even portion of said data communicated to said intermediate router, said even latching step clocked using each even edge of said modified plurality of clock signals; and latching an odd portion of said data communicated to said intermediate router, said odd latching step clocked using each odd edge of said modified plurality of clock signals.

16. The process as claimed in claim 15, wherein each odd edge of said modified plurality of clock signals is a substantially unmodified version of each corresponding odd edge of said plurality of clock signals.

17. The process as claimed in claim 13, wherein each even edge of said modified plurality of clock signals is generated by said strobe circuitry as a delayed version of each odd edge of said plurality of clock signals.

18. In a computer system having a source node coupled to a destination node through at least one intermediate node, said at least one intermediate node having a processor that processes information, said intermediate node further having a router that routes messages between said nodes, strobe communication circuitry in said intermediate router comprising:

a strobe input that receives a plurality of clock signals having alternate edges; delaying circuitry that delays each alternate edge of said plurality of clock signals to generate a modified plurality of clock signals; and clocking circuitry that clocks the messages with at least one edge of said modified plurality of clock signals and transmits said modified plurality of clock signals to a next router.

* * * * *